May 6, 1930.  H. R. MINOR  1,757,053
METHOD OF AND APPARATUS FOR CURING RUBBER ARTICLES
BY THE CIRCULATION OF HEATED GASES
Filed Aug. 28, 1926
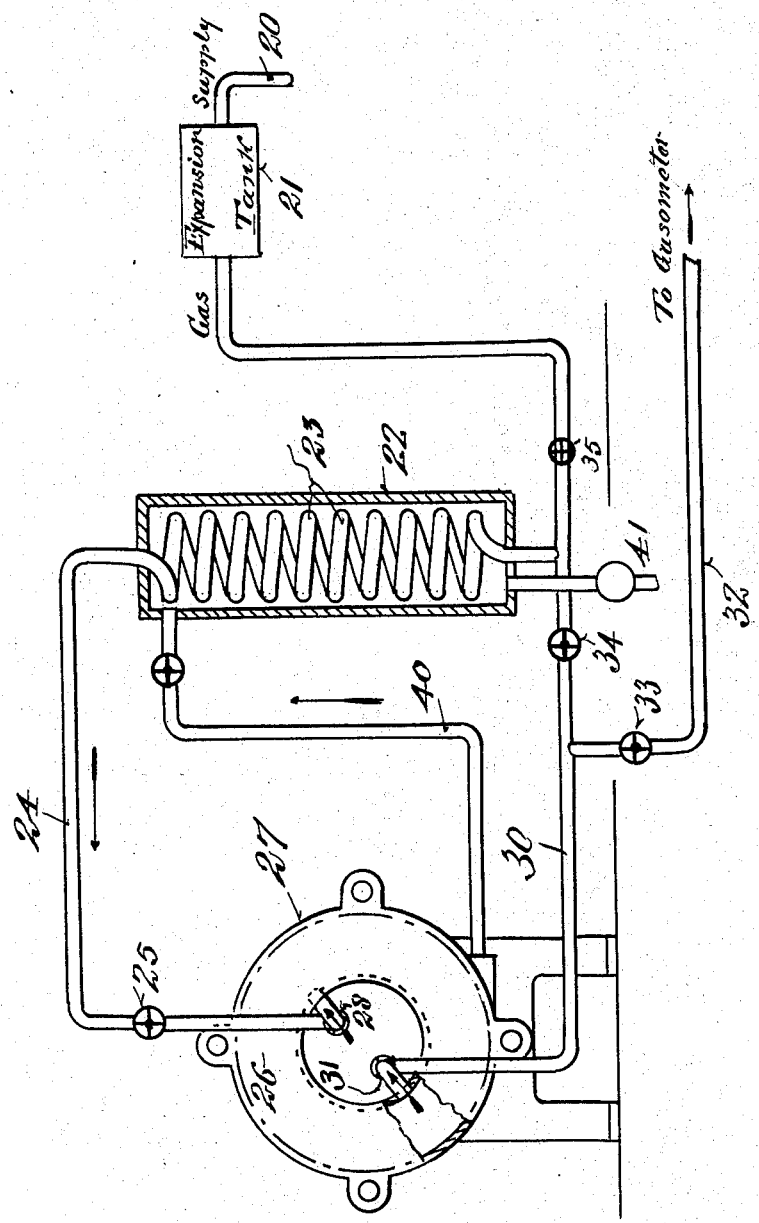
Inventor
Henry R. Minor
By his Attorneys
Darby & Darby Patented May 6, 1930

1,757,053

UNITED STATES PATENT OFFICE

HENRY R. MINOR, OF OSSINING, NEW YORK, ASSIGNOR, BY MESNE ASSIGNMENTS, TO THE LIQUID CARBONIC CORPORATION, A CORPORATION OF DELAWARE

METHOD OF AND APPARATUS FOR CURING RUBBER ARTICLES BY THE CIRCULATION OF HEATED GASES

Application filed August 28, 1926. Serial No. 132,140.

This invention relates to a method of rapidly curing molded rubber goods by the continuous circulation of heated inert gases, as carbon dioxide ($CO_2$), and to apparatus for carrying out said method.

The object of my present invention is to accelerate the curing of rubber articles and in particularly large sized articles such as truck tires or like heavy rubber goods whereit in it is found difficult to effect the cure throughout the thickness thereof. At present it is the practice to cure these articles in watch case heaters. But this operation is unsatisfactory and expensive for various reasons, including the time required for the heat to penetrate the rubber sufficiently to cure the inner plies. Attempts to accelerate the cure by applying pressure with hot water on the inside have not been satisfactory owing to the formation of air pockets and other attending difficulties including the cost and danger of removing the hot water from the air bags.

The beneficial effects of carbon dioxide ($CO_2$) when applied to an air bag, for the curing of rubber tubes for example, is known as a result of my prior investigations and discoveries, and in my copending application Serial No. 132,139, filed August 28, 1926, I have disclosed and claim apparatus for and a method of preheating a gas for the purpose of accelerating the cure. This discovery I deem of great importance. Heretofore recognized beneficial and desirable results obtained by the use of carbon dioxide in the curing of rubber goods, as tubes for example, was not deemed possible in the use of the gas because it was thought to be impractical to add sufficient heat units to a gas in order to effect the cure.

I have discovered that not only am I enabled to effect a rapid and efficient cure of the thinner rubber goods as tubes and the like, but by my present improved mode of operation I am enabled to rapidly and successfully cure even the heavy articles such for example as the heavy truck tires. While I prefer carbon dioxide ($CO_2$) as the preferred inert or non-oxidizing gas for use in carrying out my invention, I do not, of course, thereby limit my invention to the use of this gas, as nitrogen (N), flue gases and the like may be used. Furthermore, while this invention is described in its relation to air bags used in the curing of truck tires in watch case heaters, I do not thereby limit my invention, as truck tires may be cured for instance in vertical heaters.

I have discovered a mode of procedure whereby the attending named difficulties are overcome and I am enabled to convey sufficient heat units by an inert gas, as carbon dioxide, for quickly and effectively curing even the very heavy rubber truck tires. To more specifically illustrate my invention, any means whereby the heated gas is caused to circulate for reheating and return will be effective. As a specific instance I have discovered that by placing two valves in an air bag, and preferably on opposite sides, that is, one for the inlet of the preheated gas and one for its outlet, that I am able to secure a circulation of the heated gas through the article, by reason of the difference in densities of the inflowing and outflowing gases. I further find that by bleeding off a small amount of the gas from the return conduit that the circulation is much more efficient on account of the resulting pressure difference. The gas thus removed is preferably returned to the gasometer for recovery and recirculation. The main portion of the gas is however continuously recirculated directly through a heating mechanism. To compensate for the withdrawn gas it is necessary to constantly add, under proper pressure, a small amount of fresh gas. By my recirculation method of the heated gas to convey the required thermal units, I provide controllable means for curing molded rubber goods of varying mass and the cure is quickly and economically accomplished with the added beneficial results growing from the use of the gas, as carbon dioxide ($CO_2$) in particular.

My improved method of curing rubber articles as herein disclosed may be carried out by any suitable apparatus. In the accompanying drawing I have illustrated a type of apparatus somewhat diagrammatically, which is suited for carrying out my improved method. In said apparatus I use a source of gas supply 20, provided with an expansion tank 21, a pressure heater 22 through which the gas is conducted through the heating coil 23 for heating the gas. The heated gas then passes by the supply pipe 24 and its valve 25 into the air bag 26 of the watch case heater 27. The hot gas supply pipe 24 is provided with an inlet valve 28 for admitting the heated gas into the air bag and preferably on the side opposite I provide the return pipe or line 30 with an outlet valve 31 for establishing circulation of the heat conveying inert gas as carbon dioxide. The return line 30 is also provided with a branch 32 having a valve 33 through which a small amount of the returning gas is bled off or diverted to the gasometer (not shown). Valves 34 and 35 (check valves) respectively control the recirculating and inflowing gases. Heat is supplied to the pressure heater 22 by any convenient means but preferably by a steam pipe 40 for conducting steam from the vulcanizing heater directly into the pressure heater but without the heater coil 23. Condensation products are withdrawn from the pressure heater by a trap 41.

Having now described my invention what I claim as new and useful and desire to secure by Letters Patent is:

1. The method of curing rubber articles by circulating hot gases which comprises heating the curing gas and then causing said heated gas to be circulated repeatedly to the article to be cured and then accelerating the circulation of the gas without varying the pressure under which it is supplied, to cause said circulating gas to take on additional heat units for hastening the cure.

2. The method of curing rubber articles by pre-heating carbon dioxide ($CO_2$) then conducting said pre-heated carbon dioxide to the article to be cured to give up some of its heat units and then accelerating the flow of the carbon dioxide without varying the pressure under which it is supplied, to cause additional heat units to be supplied for effecting a rapid cure.

3. In an apparatus for curing rubber articles by the circulation of heated gas, the combination of a source of gas supply to provide a gaseous medium, means for heating said medium, means for conveying said heated medium to the articles to be cured and means for continuously recirculating said gaseous medium through the heating means without affecting the pressure of supply from the source.

4. In an apparatus for curing rubber articles by the circulation of heated gas, the combination of a source of gas supply to provide a gaseous medium, means for heating said medium, means for continuously circulating said heated medium to the articles and away from the articles undergoing the cure, and means for bleeding off a portion of said gas from the circulating system.

5. In an apparatus for curing rubber articles by the circulation of heated gas, the combination of a source of gas supply to provide a gaseous medium, means for heating said medium, means for continuously circulating said heated medium to the articles and away from the articles undergoing the cure, means for bleeding off a portion of said gas from the circulating system and means for constantly replenishing fresh gas from the supply source to offset the gas bled off.

6. The method of curing rubber by circulating hot gases thereto and which consists in heating the curing gas supplied from a supply source under uniform pressure, then causing the heated gas to be recirculated to the rubber to supply additional heat units thereto, and accelerating said recirculation by causing a pressure difference to be set up in the circulating system.

7. The method of curing rubber articles which consists in continuously circulating carbon-dioxide gas to the articles and accelerating the circulatory flow thereof through a preheater by bleeding off a small portion thereof without varying the pressure under which it is supplied, to increase the supply of heat units to the material to be treated, thereby hastening the curing action of the gas.

8. The method of curing rubber which consists in constantly supplying under uniform pressure a curing medium to the articles to be treated, from a source of supply through a preheating device, and tapping off a portion of the circulating medium from the circulatory system, to increase the speed of flow of such medium in the system.

9. The method of curing rubber articles which consists in constantly supplying under uniform pressure a curing medium to the articles to be treated from a source of supply through a preheating device, and speeding up the curing action of the medium by setting up a pressure difference in a portion of the circulating system without varying the pressure under which the curing medium is supplied to the system.

10. The method of curing rubber which consists in circulating a curing medium to the articles to be treated under uniform pressure from the source of supply through a preheating device, tapping off a portion of the circulating medium from the circulating supply to increase the speed of flow thereof in the circulating system, and replacing in the circulating system the portion of curing medium tapped off therefrom, by supplying additional medium from the source to the circulating system.

In testimony whereof I have hereunto set my hand on this 17th day of August A. D., 1926.

HENRY R. MINOR.